United States Patent [19]

Kunz

[11] Patent Number: 4,923,659

[45] Date of Patent: May 8, 1990

[54] METHOD OF WELDING TUBULAR COMPONENTS OF THERMOPLASTIC MATERIAL

[75] Inventor: Peter Kunz, Schaffhausen, Switzerland

[73] Assignee: George Fischer AG, Schaffhausen, Switzerland

[21] Appl. No.: 237,902

[22] Filed: Aug. 29, 1988

[30] Foreign Application Priority Data

Sep. 23, 1987 [CH] Switzerland .................... 03681/87

[51] Int. Cl.$^5$ .................... B29C 65/02; B29D 23/22
[52] U.S. Cl. .................... 264/85; 156/156;
156/304.2; 156/304.6; 264/25; 264/248;
264/521; 264/573; 264/DIG. 45; 425/174.4;
425/503; 425/508; 425/DIG. 13
[58] Field of Search .............. 156/156, 304.2, 304.4,
156/304.5, 304.6; 264/85, 248, 512, 519, 521,
545, 573, 25, DIG. 45; 425/503, 508, 174.4,
DIG. 13

[56] References Cited

U.S. PATENT DOCUMENTS

| 2,963,394 | 12/1960 | Wilkinson | 156/304.6 |
| 3,536,567 | 10/1970 | Harrison | 156/498 |
| 4,288,266 | 9/1981 | Konrad et al. | 156/158 |

FOREIGN PATENT DOCUMENTS

| 2633141 | 1/1978 | Fed. Rep. of Germany . |
| 493323 | 8/1970 | Switzerland . |

*Primary Examiner*—Jan H. Silbaugh
*Assistant Examiner*—Mathieu Vargot
*Attorney, Agent, or Firm*—Toren, McGeady & Associates

[57] ABSTRACT

A gaseous medium, preferably compressed air or nitrogen, is introduced into the interior of the tubular components to be welded together from one end and is discharged at the other end through a throttled outlet opening. As a result, an excess pressure is built up in the interior of the tubular components and the inner wall of the components is cooled. When heating the abutting ends of the tubular components by means of a heating device, the ends are not melted entirely through to the inner walls, so that the formation of an inner welding bead is avoided and the internal pressure creates a welding pressure.

15 Claims, 1 Drawing Sheet

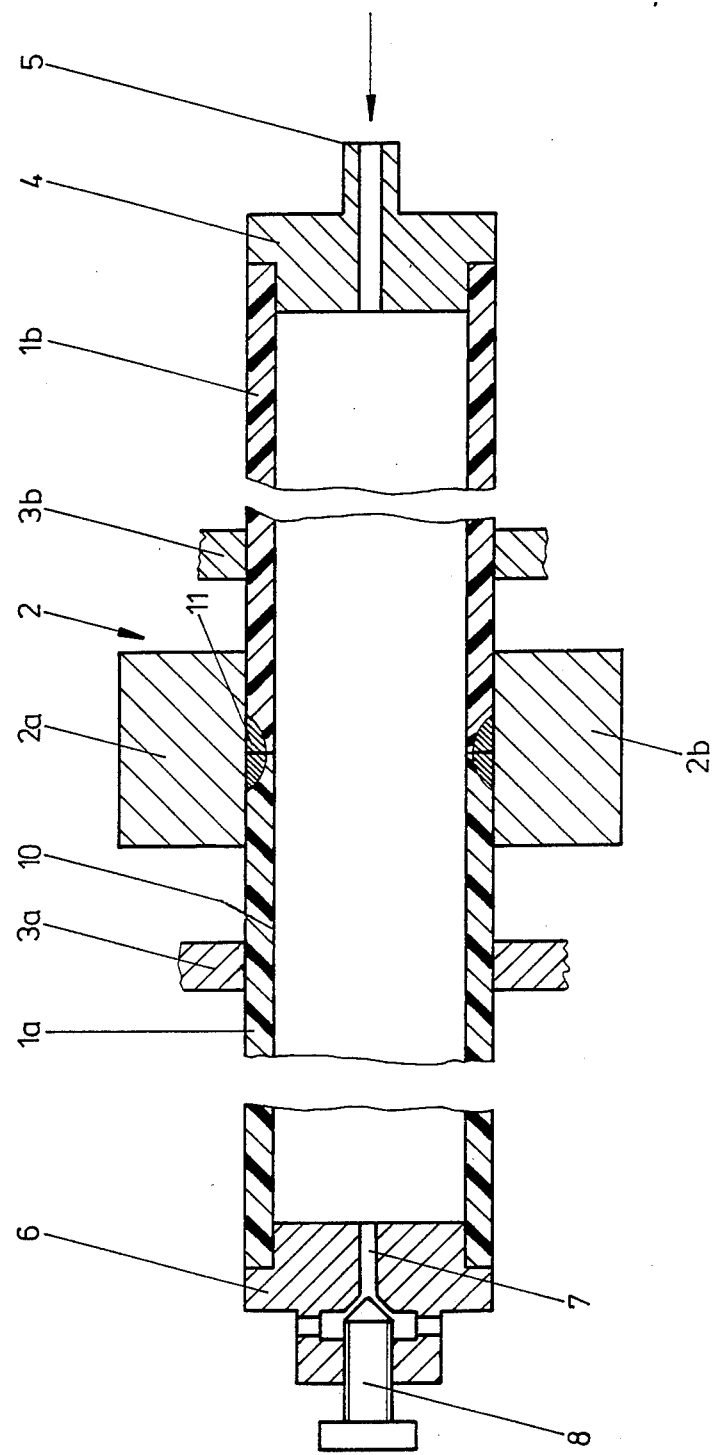

METHOD OF WELDING TUBULAR COMPONENTS OF THERMOPLASTIC MATERIAL

BACKGROUND OF THE INVENTION

1. Field of the Invention

The present invention relates to a method of welding tubular components of thermoplastic material. The method includes melting the ends of the tubular components by means of heat.

2. Description of the Prior Art

When pipes or tubular components of thermoplastic material are directly welded together by heating the abutting ends of the tubular components at the outer circumference thereof by means of a heating device, a welding bead is formed at the inner circumference of these components. This welding bead reduces the passage area through the tubular components and increases the flow resistance. This bead additionally creates the danger of undesirable deposits of dirt, bacteria, etc. Also, since the melt can flow into the interior of the tubular components, a sufficient welding pressure cannot build up, so that the welded connections do not always meet the requirements with respect to strength and tightness.

Although it is known from German Utility Model No. 8213275.2 to arrange a mechanical support device on the inner circumference of the tubular components in the region of the welding connection, this support device can only be used in connection with tubular components which are straight and do not significantly change in diameter because this support device can only be removed from tubular components of this type after welding.

It is, therefore, the primary object of the present invention to provide a method of the above-described type in which the formation of a welding bead which would reduce the inner cross-sectional area of the tubular components is avoided and in which during welding a sufficient welding pressure is built up for obtaining problem-free welded connections. In addition, it should be possible to use the method even in pipe components or pipelines which have bends and reduced diameter portions.

SUMMARY OF THE INVENTION

In accordance with the present invention, a gaseous medium is supplied to the interior of the tubular components, so that an excess pressure is built up in the region of the ends of the tubular components to be welded together.

The method according to the present invention insures a bead-free and smooth welded connection at the inner circumference of the tubular components without using inner support devices. In addition, the excess pressure of the gaseous medium in the interior of the tubular components prevents the ends of the tubular components from bending inwardly. Also, a welding pressure is generated for obtaining a problem-free welded connection.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

The single figure of the drawing is a schematic sectional view of an apparatus for carrying out the method according to the invention for welding together tubular components of thermoplastic material.

DETAILED DESCRIPTION OF THE INVENTION

The welding apparatus illustrated in the drawing includes a heating device 2 arranged on the outer circumference at the ends of the tubular components 1a, 1b of thermoplastic material to be welded together. The heating device 2 essentially includes two foldable heating jaws 2a, 2b. The ends of the tubular components are melted by applying contact heat.

The heating jaws 2a, 2b may be heated by means of electric current, hot air or a heated liquid, such as, oil. Bracing devices 3a, 3b ensure a coaxial support of the two tubular components 1a, 1b.

A connecting piece 4 with a supply line 5 for a gaseous medium, preferably compressed air or nitrogen, is arranged at an end of one of the tubular components 1b opposite the end to be welded. A connecting piece 6 with an outlet opening 7 is arranged at the end of the other tubular component 1a opposite the end to be welded. The cross-sectional area of the opening 7 can be changed by means of a throttle screw 8 in such a way that the amount of compressed air flowing through per unit of time is adjustable. Thus, it is also possible to adjust the excess pressure building up in the interior of the tubular components 1a, 1b. Preferably, the pressure should be adjustable within a range of 0.1 and 6 bar.

Simultaneously, the medium flowing through, for example, compressed air, cools the inner circumferential wall 10 of the tubular components to such an extent that the melting zone 11 at the two ends of the tubular components 1a, 1b to be welded together does not entirely reach to the inner circumference. The inner pressure also prevents the ends of the tubular components from bending inwardly during welding and, at the same time, a welding pressure directed against the heating jaws 2a, 2b is generated.

The throttle screw 8 may also be combined with a controllable check valve, so that it is possible to adjust initially a static pressure build up, preferably prior to the melting process, in order to generate the welding pressure, and subsequently to obtain a flow of the pressure medium in order to achieve additional cooling.

The ends of the tubular components 1a, 1b may also be melted by means of radiation heat.

In accordance with another method, the ends of tubular components 1a, 1b may also be heated by radiation heat with the ends being spaced apart, wherein the tubular components are subsequently joined together. After joining the components together, an excess pressure is built up in the interior of the tubular components 1a, 1b by means of the gaseous medium, so that an outwardly directed welding pressure is created.

While a specific embodiment of the invention has been shown and described in detail to illustrate the application of the inventive principles, it will be understood that the invention may be embodied otherwise without departing from such principles.

I claim:

1. A method of welding tubular components of thermoplastic material, wherein the ends of the tubular components are placed in contact with each other and then melted by applying heat, comprising building up pressure in the interior of the tubular components by supplying a gaseous medium in at least the regions of the ends of the tubular components, wherein the medium supplied to the interior of the tubular components cools the inner walls of the tubular components in the welding region, so that the temperature of the inner wall remains under the melting temperature of the thermoplastic material when the tubular components are heated.

2. The method according to claim 1, wherein the gaseous medium is air.

3. The method according to claim 1, wherein the gaseous medium is nitrogen.

4. The method according to claim 1, wherein the pressure of the gaseous medium in the interior of the tubular components is adjustable within a range of between 0.1 and 6 bar.

5. The method according to claim 1, wherein the ends of the tubular components are melted by means of radiation.

6. The method according to claim 1, wherein the ends of the tubular components are melted by means of contact heat.

7. The method according to claim 1, wherein the pressure is built up in the interior of the components prior to the melting of the ends of the tubular components.

8. The method according to claim 1, wherein the pressure is built up in the interior of the components after the melting of the ends of the tubular components.

9. The method according to claim 1, wherein the gaseous medium is air.

10. The method according to claim 1, wherein the pressure of the gaseous medium in the interior of the tubular components is adjustable within a range of between 0.1 and 6 bar.

11. A method of welding tubular components of thermoplastic material, wherein the ends of the tubular components are placed in contact with each other and then melted by applying heat, comprising building up pressure in the interior of the tubular components by supplying a gaseous medium in at least the regions of the ends of the tubular components, wherein the gaseous medium is supplied at an end of one of the tubular components and the gaseous medium is discharged through an adjustable throttle means at the end of the other tubular component.

12. The method according to claim 11, wherein the gaseous medium is nitrogen.

13. The method according to claim 11, wherein the ends of the tubular components are melted by means of radiation heat.

14. The method according to claim 11, wherein the ends of the tubular components are melted by means of contact heat.

15. The method according to claim 11, wherein the pressure is built up in the interior of the components prior to the melting of the ends of the tubular components.

* * * * *